United States Patent
Uemura et al.

(10) Patent No.: US 6,407,173 B1
(45) Date of Patent: Jun. 18, 2002

(54) IMPACT MODIFIER RESIN FOR VINYL CHLORIDE RESINS IMPROVED IN POWDER CHARACTERISTICS

(75) Inventors: Akira Uemura, Takasago; Masahito Yoshioka, Kobe; Shinichi Yauchi, Kakogawa; Akira Takaki, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/674,305

(22) PCT Filed: Mar. 23, 2000

(86) PCT No.: PCT/JP00/01757

§ 371 (c)(1),
(2), (4) Date: Oct. 31, 2000

(87) PCT Pub. No.: WO00/58399

PCT Pub. Date: Oct. 5, 2000

(30) Foreign Application Priority Data

Mar. 25, 1999 (JP) .............................. 11-081960

(51) Int. Cl.$^7$ ......................... C08L 27/06; C08L 55/00; C08F 279/00
(52) U.S. Cl. ....................... 525/191; 525/222; 525/232; 525/239; 525/241
(58) Field of Search ................................. 525/191, 222, 525/232, 239, 241

(56) References Cited

FOREIGN PATENT DOCUMENTS

| EP | 0 629 660 A1 | 12/1994 |
|---|---|---|
| JP | 3-259942 | 11/1991 |
| JP | 4-106147 | 4/1992 |

*Primary Examiner*—Nathan M. Nutter
(74) *Attorney, Agent, or Firm*—Armstrong, Westerman & Hattori, LLP

(57) ABSTRACT

A synthetic resin powder having improved powder characteristics such as granulation property and blocking resistance, which is obtained by coagulating a latex of an MBS resin satisfying the following relational equations (1) and (2):

$$-1.5x+140 \leq y \leq -1.65x+180 \quad (1)$$

$$55 \leq x \leq 70 \quad (2)$$

wherein x is a butadiene content (% by weight) in the MBS resin, and y is a Vicat softening point (°C.) of the MBS resin, adding 0.1 to 10 parts by weight of a hard polymer per 100 parts by weight of the MBS resin in the state of latex or coagulated slurry to the resulting slurry of MBS resin, and recovering a powder from the resulting mixture. The resin powder is useful as an impact modifier for vinyl chloride resins and can impart an excellent impact resistance without impairing the transparency of vinyl chloride resins.

2 Claims, No Drawings

IMPACT MODIFIER RESIN FOR VINYL CHLORIDE RESINS IMPROVED IN POWDER CHARACTERISTICS

TECHNICAL FIELD

The present invention relates to a synthetic resin having improved powder characteristics, and more particularly to an MBS resin useful as an impact modifier for vinyl chloride resins.

BACKGROUND ART

Vinyl chloride resins are thermoplastic resins which are inexpensive and excellent in transparency, and are general purpose type resins which are widely used for wrapping for the property of transparency. Vinyl chloride resins are also used in building materials such as side wall, window frame and sash, and hard products such as pipe and joint for the good properties of mechanical strength, weatherability and chemical resistance. However, in many cases of using vinyl chloride resins for these purposes, vinyl chloride resins are not sufficient in impact resistance and, therefore, a methyl methacrylate/butadiene/styrene copolymer (MBS resin) has been generally incorporated as an impact modifier into vinyl chloride resins in order to impart an impact strength thereto. Particularly, in recent years, it is more strongly demanded than before that the MBS resin for vinyl chloride resins can highly improve the impact strength.

As a general method to further improve the impact strength of vinyl chloride resins with MBS resins, it has been conventionally adopted to increase the proportion of a rubber to be used in the MBS resins, namely to increase the proportion of butadiene (Bd). However, if the content of Bd units in the MBS resins is increased too much, the powder characteristics of MBS resins are markedly deteriorated. For example, since the granulation property is lowered, a massive resin is only obtained when powdering the resin from a latex and, therefore, it is difficult to make the product by a plant. Also, there arises a so-called blocking problem that since blocking occurs during storage or transfer of the powdery product, it is difficult to take out the MBS resin from silo, container or bag, or since bridging occurs in the vicinity of a discharge port when discharging from a hopper, spontaneous discharge is not possible.

Improvement in such powder characteristics of MBS resins is also strongly demanded in recent years, and the powder characteristics are now one of important characteristics of MBS resins. Various proposals for improving the powder characteristics have hitherto been reported. For example, Japanese Patent Publication Kokai No. 57-59929 discloses a method for improving the blocking resistance by coagulating a latex of a graft copolymer in a gas phase. Japanese Patent Publication Kokai No. 7-3106 discloses a method for improving the blocking resistance by adding a specific polymer to MBS resins. However, in case of MBS resins having a high Bd content, these methods still cannot achieve the powder characteristics demanded.

As mentioned above, it is essential for imparting a higher impact resistance to vinyl chloride resins to use a larger amount of Bd. Also, in case that vinyl chloride resins are used for the purposes which require a transparency, it is also necessary for maintain the transparency to fairly strictly match the refraction index of MBS resin with that of a vinyl chloride resin and, therefore, the composition of components constituting the MBS resin is restricted. Like this, due to the contradictory factors and restriction in constituting components, it is very difficult to improve the powder characteristics of MBS resins having a high Bd content to be incorporated into vinyl chloride resins intended to use for purposes which require a transparency.

It is an object of the present invention to provide, under circumstances as mentioned above, an MBS resin used for vinyl chloride resins having a high transparency, which has a high Bd content but has an improved powder characteristics.

A further object of the present invention is to provide an impact modifier for vinyl chloride resins, which is improved in granulation property and blocking resistance and which can impart a high impact resistance to the vinyl chloride resins.

Another object of the present invention is to provide a vinyl chloride resin composition having excellent transparency and impact resistance which comprises a vinyl chloride resin and an MBS resin type impact modifier.

DISCLOSURE OF INVENTION

The present invention provides a resin having an improved powder characteristics and useful as an impact modifier for vinyl chloride resins, which comprises an MBS resin satisfying the following relational equations (1) and (2):

$$-1.5x+140 \leq y \leq -1.65x+180 \quad (1)$$

$$55 \leq x \leq 70 \quad (2)$$

wherein x is a butadiene content (% by weight) in the MBS resin, and y is a Vicat softening point (°C.) of the MBS resin, and 0.1 to 10 parts by weight of a hard polymer per 100 parts by weight of said MBS resin, and which is obtained by coagulating a latex of said MBS resin, adding said hard polymer in the state of latex or coagulated slurry to the resulting coagulated slurry of MBS resin, and recovering the powder from the resulting mixture.

As the hard polymer is preferably used a copolymer of methyl methacrylate, an aromatic vinyl monomer, a crosslinking agent and 0 to 30% by weight of other copolymerizable monomer.

BEST MODE FOR CARRYING OUT THE INVENTION

The MBS resins used in the present invention are prepared by graft-polymerizing a monomer component comprising an alkyl methacrylate, preferably methyl methacrylate, an aromatic vinyl compound such as styrene and optionally other vinyl monomers copolymerizable therewith such as methyl acrylate, ethyl acrylate, butyl acrylate and acrylonitrile onto a crosslinked or non-crosslinked butadiene-based rubber such as polybutadiene (PBd), styrene-butadiene rubber (SBR) or acrylonitrile-butadiene rubber (NBR) in a conventional manner.

The content x of Bd (weight percentage of Bd monomer units) included in MBS resins is from 55 to 70% by weight, preferably from 60 to 68% by weight. If the Bd content is less than 55% by weight, the impact resistance of molded articles prepared by mixing with a vinyl chloride resin and molding the resulting mixture is insufficient. If the Bd content exceeds 70% by weight, the amount of Bd is too much, so not only a good powder is not obtained due to formation of a mass in the step of powdering the MBS resin from a latex obtained as a result of polymerization, but also the transparency of vinyl chloride resin molded articles cannot be retained because it becomes difficult to match the refraction index of the MBS resin with that of a vinyl chloride resin. MBS resins having a Bd content of 60 to 68% by weight are preferable since they can provide vinyl chloride resins with a sufficient impact strength and, moreover, a powder having good powder characteristics is obtained.

The blocking resistance which is a measure of the powder characteristics has a close relationship to the Vicat softening point (°C.) of MBS resin. The Vicat softening point is measured under a load of 1 kg according to JIS K 7206. In general, the higher the softening point, the better the granulation property and the blocking resistance. The range of the Vicat softening point (y) of MBS resin used in the present invention is represented by the following equation:

$$-1.5x+140 \leq y \leq -1.65x+180,$$

preferably, $$-1.2x+128 \leq y \leq -1.65x+180$$

wherein x is the Bd content (% by weight) of MBS resin.

If the Vicat softening point (y) is less than "$-1.5x+140$", the granulation property is bad since the softening point becomes too low with respect to the Bd content. From the viewpoint of better granulation property, it is preferable that the Vicat softening point is not less than "$-1.2x+128$". If the Vicat softening point is more than "$-1.65+180$", the impact resistance-improving effect of MBS resin is lowered.

In general, the Vicat softening point is mainly determined by the kinds and amounts of monomers which constitute MBS resin and is closely related with the glass transition temperatures of the respective components, although it is also affected by the molecular arrangement of the monomers and the intramolecular or intermolecular structure of the monomers. For example, among methyl methacrylate, butadiene and styrene which can be used as the components of MBS resin, if butadiene which is low in glass transition temperature is used in a large amount, the Vicat softening point is lowered, and if methyl methacrylate or styrene which are relatively high in glass transition temperature is used in a large amount, the Vicat softening point is raised. Also, even in the case of MBS resins which are composed of the same kinds and same amounts of monomers, the Vicat softening points differ if the rubbers used therein are for example a polybutadiene and a styrene-butadiene copolymer rubber. Further, MBS resins having a high degree of intramolecular or intermolecular crosslinking tend to have a high Vicat softening point. The Vicat softening point of the obtained MBS resin can be adjusted by selecting and adjusting the kinds and amounts of the monomers used.

The modified MBS resin of the present invention having an improved powder characteristics is required to have a refraction index matched with the refraction index of a vinyl chloride resin to be incorporated therewith so that the transparency of the vinyl chloride resin is maintained. The difference in refraction index between the modified MBS resin and a vinyl chloride resin is preferably at most 0.02, and is more preferably at most 0.01 from the viewpoint that a higher transparency is obtained. If the difference in refraction index is more than 0.02, the transparency of molded articles composed of vinyl chloride resin and modified MBS resin is markedly lowered. The difference in refraction index between the modified MBS resin and a vinyl chloride resin may be selected in accordance with the level of transparency required. In case that a high transparency is required, it is necessary to make the refraction index difference small, and in case of uses which do not require a transparency much, a relatively large difference in refraction index is sufficient.

Refraction index values described in various literatures such as Polymer Handbook (John Willy & Sons. Inc., 1989) can be adopted in the present invention. The refraction index of a copolymer can be obtained by the total of the products of the refraction index of each of monomers and the weight fraction thereof. The refraction index of a mixture can be obtained by the total of the products of the refraction index of each of the components and the volume fraction thereof.

The method of the polymerization for MBS resins is not particularly limited, but an emulsion polymerization method is desirable from the viewpoints of control in particle size and removal of heat generated in polymerization.

As the rubber component of the MBS resins are used polybutadiene rubber and butadiene copolymer rubbers such as SBR and NBR prepared from Bd and other monomers copolymerizable with Bd. The copolymerizable other monomers are not particularly limited. Examples of the copolymerizable other monomers are, for instance, an alkyl acrylate having a $C_1$ to $C_5$ alkyl group such as butyl acrylate, an aromatic vinyl compound such as styrene, a vinyl cyanide compound such as acrylonitrile, and other vinyl monomers. These may be used alone or in combination thereof. It is preferable that the content of the other monomers copolymerizable with Bd in the butadiene copolymer rubbers is not more than 30% by weight. Crosslinking agents and chain transfer agents which have been conventionally used in the polymerization for the rubber component, can also be used. Representative examples of the crosslinking agent are compounds having at least two polymerizable groups in the molecule, such as divinyl benzene, 1,3-butylene glycol dimethacrylate, allyl methacrylate and diallyl phthalate. These crosslinking agents may be used alone or in combination thereof. Representative examples of the chain transfer agent are, for instance, n-dodecylmercaptan, t-dedecylmercaptan and the like.

As the monomers used in the polymerization for the graft portion of the MBS resin, there can be used those used in the preparation of known MBS resins. Known MBS resins have been generally prepared by graft-polymerizing a monomer component comprising an alkyl methacrylate, an aromatic vinyl compound and optionally other vinyl compounds copolymerizable therewith onto a butadine-based rubber. Examples of the alkyl methacrylate are an alkyl methacrylate having a $C_1$ to $C_{12}$ alkyl group such as methyl methacrylate, ethyl methacrylate, propyl methacrylate or butyl methacrylate, and mixtures thereof. Preferable are methyl methacryalte and a mixture of alkyl methacryaltes containing a major amount of methyl methacrylate. Examples of the aromatic vinyl compound are styrene, a styrene derivative such as a-methylstyrene or chlorostyrene, and a mixture thereof. Styrene is preferably used. Examples of the optionally used other vinyl compounds are, for instance, an alkyl acrylate having a $C_1$ to $C_{12}$ alkyl group such as methyl acrylate, ethyl acrylate or butyl acrylate, a vinyl cyanide compound such as acrylonitrile or methacrylonitrile, and the like. These may be used alone or in combination thereof. It is preferable that the monomers used in the graft polymerization are selected so as not to impair the transparency of vinyl chloride resins. When adding the monomer component to the polymerization, respective monomers may be separately added to the polymerization system all at once or continuously. Also, a mixture of the monomers may be added all at once or continuously. Further, necessary amounts of a crosslinking agent and a chain transfer agent as mentioned above can be used.

Also, upon conducting the above-mentioned polymerization by means of an emulsion polymerization method, emulsifying and dispersing agents conventionally used for stabilization of emulsification in the emulsion polymerization and polymerization initiators conventionally used can be used. Examples of the emulsifying and dispersing agents are anionic surface agents, non-ionic surface agents, polyvinyl alcohol and the like. Examples of the polymerization initiators are, for instance, peroxide radical polymerization initiators such as azobisisobutyronitrile, azobisvaleronitrile, benzoyl peroxide, lauryl peroxide, t-butyl hydroperoxide, cumene hydroperoxide and potassium persulfate, and the like. The same initiator may be used throughout the polymerization, or different initiators may be used in respective stages of polymerization. If necessary, suitable oxidizing and reducing agents may be used as a redox polymerization initiator. Also, in case of adopting different polymerization methods, additives required in each polymerization method may be used, such as emulsifier, dispersant, stabilizer, pH adjusting agent and the like.

Method for recovering a resin powder from the thus obtained MBS resin latex is not particularly limited. For example, a powder can be obtained by adding a necessary amount of a salt such as calcium chloride, magnesium chloride or magnesium sulfate or an acid such as hydrochloric acid or phosphoric acid to a polymer latex to coagulate the latex, and elevating the temperature to 60 to 100° C. with stirring to heat-treat the resulting slurry, followed by dehydration and drying. At that time, various stabilizers such as phenol type, sulfur type or hindered amine type stabilizers can be used.

In the present invention, after forming the MBS resin latex to a slurry, a hard polymer is added to the slurry so that the hard polymer effectively sticks to the surface of MBS resin particles. The hard polymer to be added may be in the state of latex or in the state of slurry formed by adding an acid or salt as mentioned above to the latex to coagulate the latex. After the addition of the hard polymer to the MBS resin slurry, the temperature is raised to 60 to 100° C. to heat-treat the resulting mixture, and the mixture is then dehydrated and dried to give an objective resin powder having an improved powder characteristics. When the hard polymer has been added in the state of latex, the resulting mixture is subjected to the heat treatment, dehydration and drying after coagulating it with an acid or a salt or directly if the mixture is coagulated by merely mixing it.

The amount of the hard polymer is from 0.1 to 10 parts by weight, preferably 0.5 to 4 parts by weight, per 100 parts by weight of the MBS resin. If the amount of the hard polymer is less than the above range, the effect of improving the blocking resistance of the MBS resin is small. If the amount is too large, the physical properties of vinyl chloride resin molded articles such as transparency are lowered.

The hard polymers used for imparting a blocking resistance to the MBS resins are not particularly limited, but polymers comprising methyl methacrylate, an aromatic vinyl monomer, a crosslinking agent and optionally other copolymerizable monomers are preferred from the viewpoint of exhibiting a particularly high effect. In the hard polymers, the content of methyl methacrylate is preferably from 30 to 60% by weight, more preferably from 35 to 55% by weight, the content of the aromatic vinyl monomer is preferably from 35 to 65% by weight, more preferably from 40 to 50% by weight, and the content of the crosslinking agent is preferably from 0.1 to 25% by weight, more preferably from 0.1 to 10% by weight, still more preferably from 3 to 7% by weight. Other monomers copolymerizable with these monomers may be used. The content of the other monomers in the hard polymer is from 0 to 30% by weight, preferably from 0 to 10% by weight. If the contents of the above monomers do not fall within the respective ranges, not only the blocking resistance is lowered, but also the transparency of final molded articles are lowered since it becomes difficult to match the refraction index of the hard polymer with that of a vinyl chloride resin. From the viewpoint of minimizing the lowering of the transparency, it is preferable that the hard polymers have a refraction index such that the difference between it and a vinyl chloride resin is not more than 0.1, especially not more than 0.05.

Examples of the aromatic vinyl monomer used in the hard polymers are, for instance, styrene, a-methylstyrene, a halogenated styrene and other styrene derivatives. These may be used alone or in combination thereof.

Examples of the crosslinking agent used in the hard polymers are, for instance, divinyl benzene, 1,3-butylene glycol dimethacrylate, polyethylene glycol dimethacrylate, and other known crosslinking agents such as divinyl compounds, dimethacrylate compounds, diacrylate compounds and diallyl compounds. These may be used alone or in combination thereof.

Examples of the other copolymerizable monomers used in the hard polymers are an alkyl acrylate having a $C_1$ to $C_{12}$ alkyl group, an alkyl methacrylate having a $C_2$ to $C_{12}$ alkyl group, a vinyl cyanide compound such as acrylonitrile or methacrylonitrile, acrylic acid, methacrylic acid, and the like. The other copolymerizable monomers are not limited to these exemplified monomers.

The average particle size of the hard polymers is usually from 400 to 3,000 Å (40 to 300 nm), and is preferably from 1,000 to 2,500 Å (100 to 250 nm) from the viewpoints of the blocking resistance-improving effect and the transparency of vinyl chloride resin molded articles.

The method of the polymerization for the hard polymers is not particularly limited, but an emulsion polymerization method is preferred from the viewpoint of ease in controlling the average particle size of the polymers. The emulsion polymerization can be conducted in a usual manner and, for example, a polymerization initiator, emulsifier and other additives as mentioned above can be used.

The resin powder comprising an MBS resin and 0.1 to 10 parts by weight of a hard polymer per 100 parts by weight of the MBS resin according to the present invention is useful as an impact modifier for vinyl chloride resins, and is applicable to known vinyl chloride resins. Examples of the vinyl chloride resins are, for instance, polyvinyl chloride resin, post-chlorinated polyvinyl chloride resin, partially crosslinked polyvinyl chloride resin, polyvinylidene chloride, copolymers of at least 50% by weight, especially at least 70% by weight, of vinyl chloride and a monomer copolymerizable with vinyl chloride such as ethylene, propylene, styrene, vinyl acetate, alkyl acrylates, alkyl methacrylates, vinyl cyanide, vinylidene chloride, an unsaturated acid monomer such as acrylic acid or methacrylic acid, maleic ester, or fumaric ester. The resin powder of the present invention is usually employed in an amount of 2 to 30 parts by weight per 100 parts by weight of a vinyl chloride resin.

The present invention is more specifically explained by means of examples wherein all parts and % are by weight unless otherwise noted. It is to be understood that the present invention is not limited to these examples.

EXAMPLE 1

(1) Preparation of Rubber Latex

A polymerization reactor equipped with a stirrer was charged with 200 parts of water, 1.5 parts of sodium oleate, 0.002 part of ferrous sulfate (FeSO$_4$.7H$_2$O), 0.005 part of disodium ethylenediamine-tetraacetate, 0.2 part of sodium formaldehyde sulfoxylate, 0.2 part of potassium tertiary phosphate, 59 parts of butadiene, 10 parts of styrene, 1.0 part of divinyl benzene and 0.1 part of diisopropylbenzene hydroperoxide. After stirring at 50° C. for 7 hours, 30 parts of butadiene and 0.05 part of diisopropylbenzene hydroperoxide were added to the reactor. After 2 hours, 0.05 part of diisopropylbenzene hydroperoxide was further added, and the polymerization was further continued for 5 hours to give a latex (R-1) of a rubber having a weight average particle size of 750 Å (75 nm). The polymerization conversion was 97%.

(2) Preparation of MBS Resin

An 8 liter glass polymerization reactor was charged with 190 parts (solid matter 63 parts) of the rubber latex (R-1), 70 parts of water, 0.002 part of ferrous sulfate (FeSO$_4$.7H$_2$O), 0.004 part of disodium ethylenediaminetetraacetate and 0.1 part of sodium formaldehyde sulfoxylate. After mixing, the temperature was elevated to 60° C. A mixture of 15 parts of methyl methacrylate and 0.05 part of cumene hydroperoxide was then continuously added over 1.5 hours. After further stirring for 30 minutes, a mixture of 22 parts of styrene and 0.1 part of cumene hydroperoxide was continuously added to the reactor over 2 hours. After further stirring for 1 hour, the reaction mixture was cooled to room temperature to give a latex (G-1) of an MBS resin.

(3) Preparation of Hard Polymer

An 8 liter glass polymerization reactor was charged with 200 parts of water, 0.1 part of sodium oleate, 0.002 part of ferrous sulfate (FeSO$_4$.7H$_2$O), 0.005 part of disodium ethylenediaminetetraacetate and 0.2 part of sodium formaldehyde sulfoxylate. After mixing, the temperature was elevated to 70° C. A mixture of 45 parts of methyl methacrylate, 40 parts of styrene and 0.3 part of cumene hydroperoxide was then continuously added over 6 hours. Subsequently, a mixture of 10 parts of methyl methacrylate, 5 parts of 1,3-butylene glycol dimethacrylate and 0.1 part of cumene hydroperoxide was continuously added over 1 hour. During this period, 0.5 part portions of sodium oleate were added 2 hours, 4 hours and 6 hours after starting the polymerization. After the completion of the addition of the monomer mixture, stirring was continued for 2 hours to complete the polymerization and to give a polymer latex (L-1). The polymerization conversion of the polymer latex (L-1) was 99%, and the average particle size was 1,520 Å (152 nm).

(4) Preparation of MBS Resin Powder Incorporated with Hard Polymer

To 100 parts (solid basis) of the MBS resin latex (G-1) obtained in (2) was added a 1% aqueous solution of hydrochloric acid (1 part of hydrochloric acid) to coagulate the latex. To the obtained slurry was added with stirring 3 parts (solid basis) of the hard polymer latex (L-1) obtained in (3). The resulting mixture was heat-treated at 90° C. for 10 minutes, washed, dehydrated and dried to give a synthetic resin powder.

(5) Measurement of Vicat Softening Point

The synthetic resin powder obtained in (4) was kneaded at 170° C. for 3 minutes by an 8 inch test roll mill and was pressed at 180° C. for 10 minutes to give a molded article having a thickness of 5.0 mm. With respect to this molded article, the Vicat softening point was measured under a load of 1 kg according to JIS K 7206. The result is shown in Table 1.

(6) Evaluation of Blocking Resistance

A cylindrical vessel having a diameter of 40 mm was charged with 30 g of the synthetic resin powder obtained in (4), and a load of 1 kg/cm$^2$ was applied to the powder at 40° C. for 3 hours to form a block. The block was vibrated at 60 Hz for 100 seconds by a Powder Tester PFE made by Hosokawa Micron Kabushiki Kaisha to break the block. The weight proportion of a synthetic resin powder which passed through a 18 mesh sieve based on the whole synthetic resin powder used was obtained. The result is shown in Table 1. The larger the value, the higher the blocking resistance.

(7) Evaluation of Physical Properties of Vinyl Chloride Resin Composition

By an 8 inch test roll mill were kneaded 10 parts of the synthetic resin powder obtained in (4), 1.2 parts of a tin stabilizer (TVS8831 made by Nitto Kasei Kabushiki Kaisha), 0.5 part of a lubricant (Loxiol G-11 made by Henkel Japan Kabushiki Kaisha) and 100 parts of a polyvinyl chloride resin (S-1007 made by Kaneka Corporation) at 160° C. for 8 minutes. The resulting composition was pressed at 190° C. for 15 minutes to give a molded article having a thickness of 5.0 mm. Using the obtained molded article, the impact resistance was measured according to JIS K 7110 and the light transmission was measured according to JIS K 6714. The results are shown in Table 1.

EXAMPLE 2

MBS resin latex (G-2) was obtained in the same manner as in Example 1 except that in "(2) preparation of MBS resin", 203 parts of rubber latex (R-1) (solid matter 67 parts) was used, 13 parts of methyl methacrylate was firstly graft-polymerized and 20 parts of styrene was then graft-polymerized. Further, a synthetic resin powder was prepared and evaluated in the same manner as in Example 1 except that the MBS resin latex (G-2) was used instead of MBS resin latex (G-1). The results are shown in Table 1.

EXAMPLE 3

MBS resin latex (G-3) was obtained in the same manner as in Example 1 except that in "(2) preparation of MBS resin", 203 parts of rubber latex (R-1) (solid matter 67 parts) was used, and after firstly adding a mixture of 3 parts of 1,3-butylene glycol dimethacrylate and 0.1 part of cumene hydroperoxide all at once and stirring for 30 minutes, 12 parts of methyl methacrylate was graft-polymerized and 18 parts of styrene was then graft-polymerized. Further, a synthetic resin powder was prepared and evaluated in the same manner as in Example 1 except that the MBS resin latex (G-3) was used instead of MBS resin latex (G-1). The results are shown in Table 1.

EXAMPLE 4

MBS resin latex (G-4) was obtained in the same manner as in Example 1 except that in "(2) preparation of MBS resin", 212 parts of rubber latex (R-1) (solid matter 70 parts) was used, and 10 parts of methyl methacrylate was firstly graft-polymerized onto the rubber and 20 parts of styrene was then graft-polymerized. Further, a synthetic resin powder was prepared and evaluated in the same manner as in Example 1 except that the MBS resin latex (G-4) was used instead of MBS resin (G-1). The results are shown in Table 1.

EXAMPLE 5

MBS resin latex (G-5) was obtained in the same manner as in Example 1 except that in "(2) preparation of MBS resin", 224 parts of rubber latex (R-1) (solid matter 74 parts) was used, and 10 parts of methyl methacrylate was firstly graft-polymerized onto the rubber and 16 parts of styrene was then graft-polymerized. Further, a synthetic resin powder was prepared and evaluated in the same manner as in Example 1 except that the MBS resin latex (G-5) was used instead of MBS resin (G-1). The results are shown in Table 1.

EXAMPLE 6

MBS resin latex (G-6) was obtained in the same manner as in Example 1 except that in "(2) preparation of MBS resin", 224 parts of rubber latex (R-1) (solid matter 74 parts) was used, and after firstly adding a mixture of 3 parts of 1,3-butylene glycol dimethacrylate and 0.1 part of cumene hydroperoxide all at once and stirring for 30 minutes, 9 parts of methyl methacrylate was graft-polymerized onto the rubber and 14 parts of styrene was then graft-polymerized. Further, a synthetic resin powder was prepared and evaluated in the same manner as in Example 1 except that the MBS resin latex (G-6) was used instead of MBS resin latex (G-1). The results are shown in Table 1.

EXAMPLE 7

Hard polymer latex (L-2) was prepared in the same manner as in Example 1 except that in "(3) preparation of hard polymer", a mixture of 35 parts of methyl methacrylate, 45 parts of styrene, 20 parts of 1,3-butylene glycol dimethacrylate and 0.3 part of cumene hydroperoxide was continuously added over 7 hours. A synthetic resin powder was prepared and evaluated in the same manner as in Example 1 except that the hard polymer latex (L-2) was added to the slurry of the MBS resin latex (G-4) obtained in Example 4. The results are shown in Table 1.

Comparative Example 1

The procedure of Example 2 was repeated except that hard polymer latex (L-1) was not added. The results are shown in Table 1.

Comparative Example 2

The procedure of Example 2 was repeated except that the hard polymer latex (L-1) was used in an amount of 15 parts (solid basis). The results are shown in Table 1.

Comparative Example 3

A rubber latex (R-2) having a weight average particle size of 780 Å (78 nm) was prepared in the same manner as in Example 1 except that in "(1) preparation of rubber latex", 75 parts of butadiene, 25 parts of styrene, 1.0 part of divinyl benzene and 0.1 part of diisopropylbenzene hydroperoxide were initially charged. The polymerization conversion was 98%. MBS resin latex (G-7) was then obtained in the same manner as in Example 1 except that in "(2) preparation of MBS resin", 70 parts (solid basis) of rubber latex (R-2) was used, and 15 parts of methyl methacrylate was firstly graft-polymerized and 15 parts of styrene was then graft-polymerized. A synthetic resin powder was prepared and evaluated in the same manner as in Example 1 except that the MBS resin latex (G-7) was used instead of MBS resin latex (G-1). The results are shown in Table 1.

Comparative Example 4

MBS resin latex (G-8) was obtained in the same manner as in Example 1 except that in "(2) preparation of MBS resin", 242 parts of rubber latex (R-2) (solid matter 80 parts) was used, and 10 parts of methyl methacrylate was firstly graft-polymerized onto the rubber and 10 parts of styrene was then graft-polymerized. A synthetic resin powder was prepared and evaluated in the same manner as in Example 1 except that the MBS resin latex (G-8) was used instead of MBS resin latex (G-1). The results are shown in Table 1.

TABLE 1

| | Bd content in MBS (%) | Vicat softening point (°C.) | Blocking resistance | Physical property of PVC resin composition | |
|---|---|---|---|---|---|
| | | | | Impact resistance (kg · cm/cm$^2$) | Light transmission (%) |
| Ex. 1 | 56.7 | 62 | 80 | 55 | 80 |
| Ex. 2 | 60.3 | 58 | 75 | 60 | 80 |
| Ex. 3 | 60.3 | 70 | 75 | 50 | 82 |
| Ex. 4 | 63.0 | 55 | 70 | 62 | 81 |
| Ex. 5 | 66.6 | 48 | 50 | 68 | 79 |
| Ex. 6 | 66.6 | 59 | 70 | 55 | 81 |
| Com. Ex. 1 | 60.3 | 58 | 5 | 62 | 80 |
| Com. Ex. 2 | 60.3 | 58 | 95 | 50 | 73 |
| Com. Ex. 3 | 52.5 | 64 | 65 | 35 | 74 |
| Com. Ex. 4 | 60.0 | 29 | 50 | 53 | 72 |

The synthetic resin powders of the Examples are excellent in blocking resistance, impact resistance and transparency as compared with those of the Comparative Examples.

Industrial Applicability

The impact modifier of the present invention suitable for use in vinyl chloride resins has good powder characteristics and can provides vinyl chloride resins with an excellent impact resistance without impairing the transparency of the vinyl chloride resins.

What is claimed is:

1. A resin having an improved powder characteristics and useful as an impact modifier for vinyl chloride resins, which comprises an MBS resin satisfying the following relational equations (1) and (2):

$$-1.5x+140 \leq y \leq -1.65x+180 \quad (1)$$

$$55 \leq x \leq 70 \quad (2)$$

wherein x is a butadiene content (% by weight) in the MBS resin, and y is a Vicat softening point (°C.) of the MBS resin, and 0.1 to 10 parts by weight of a hard polymer per 100 parts by weight of said MBS resin, and which is obtained by coagulating a latex of said MBS resin, adding said hard polymer in the state of latex or coagulated slurry to the resulting coagulated slurry of MBS resin, and recovering the powder from the resulting mixture.

2. The resin of claim 1, wherein said hard polymer is a polymer composed of 30 to 60% by weight of methyl methacrylate, 35 to 65% by weight of an aromatic vinyl monomer, 0.1 to 25% by weight of a crosslinking agent and 0 to 30% by weight of other copolymerizable monomers.

* * * * *